US008949810B2

(12) United States Patent
Andrade et al.

(10) Patent No.: US 8,949,810 B2
(45) Date of Patent: Feb. 3, 2015

(54) METHOD FOR HIGH-PERFORMANCE DATA STREAM PROCESSING

(75) Inventors: Henrique Andrade, Croton-on-Hudson, NY (US); Bugra Gedik, White Plains, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1313 days.

(21) Appl. No.: 12/139,651

(22) Filed: Jun. 16, 2008

(65) Prior Publication Data

US 2009/0313614 A1    Dec. 17, 2009

(51) Int. Cl.
*G06F 9/45* (2006.01)
(52) U.S. Cl.
CPC ..................... *G06F 8/451* (2013.01)
USPC .......................................................... 717/151
(58) Field of Classification Search
CPC ....................................................... G06F 8/451
USPC .......................................................... 717/151
See application file for complete search history.

(56) References Cited

U.S. PATENT DOCUMENTS

| 6,952,825 | B1 * | 10/2005 | Cockx et al. | 718/102 |
| 2003/0002474 | A1 * | 1/2003 | Alexander et al. | 370/351 |
| 2007/0226239 | A1 * | 9/2007 | Johnson et al. | 707/101 |
| 2008/0134158 | A1 * | 6/2008 | Salz et al. | 717/148 |

OTHER PUBLICATIONS

Gedik et al., SPADE: The System S Declarative Stream Processing Engine, International Conference on Management of Data, ACM SIGMOD, Vancouver, Canada, 2008.*
Abadi et al., The Design of the Borealis Stream Processing Engine, Proceedings of the 2005 CIDR Conference.
Beynon et al., DataCutter: Middleware for Filtering Very Large Scientific Datasets on Archival Storage Systems, Proceedings of the 8th Goddard Conference on Mass Storage Systems and Technologies/17th IEEE Symposium on Mass Storage Systems, College Park, MD, Mar. 2000.
Caltech. Sensing and Responding: Mani Chandy's biologically inspired approach to crisis management. ENGenious—Caltech Division of Engineering and Applied Sciences, Winter 2003.

(Continued)

*Primary Examiner* — Wei Zhen
*Assistant Examiner* — Mohammed Huda
(74) *Attorney, Agent, or Firm* — Ryan, Mason & Lewis, LLP

(57) ABSTRACT

Techniques for optimizing data stream processing are provided. The techniques include employing a pattern, wherein the pattern facilitates splitting of one or more incoming streams and distributing processing across one or more operators, obtaining one or mote operators, wherein the one or more operators support at least one group-independent aggregation and join operation on one or more streams, generating code, wherein the code facilitates mapping of the application onto a computational infrastructure to enable workload partitioning, using the one or more operators to decompose each of the application into one or more granular components, and using the code to reassemble the one or more granular components into one or more deployable blocks to map the application to a computational infrastructure, wherein reassembling the one or more granular components to map the application to the computational infrastructure optimizes data stream processing of the application.

24 Claims, 11 Drawing Sheets

(56) References Cited

OTHER PUBLICATIONS

Reuters Professional—stock market data feed. http://about.reuters.com/productinfo/s/ stock market data feed, Oct. 2007.
Jain et al., Design, Implementation, and Evaluation of the Linear Road Benchmark on the Stream Processing Core, International Conference on Management of Data, ACM SIGMOD, Chicago, IL, 2006.
MATLAB, http://www.mathworks.com, Oct. 2007.
Upadhyaya et al., Expressing and Exploiting Concurrency in Networked Applications with Aspen, Symposium on Principles and Practice of Parallel Programming, ACM PPoPP, San Jose, CA, 2007.
Amini et al., SPC: A Distributed, Scalable Platform for Data Mining, Workshop on Data Mining Standards, Services and Platforms, DM-SSP, Philadelphia, PA, 2006.
Carzaniga et al., Design and Evaluation of a Wide-Area Even Notification Service, ACM Transactions on Computer System, 19(3):332-383, 2001.
L. Davidsen, Building an ESB without limits. ftp://ftp.software.ibm.com/software/integration/library/whitepapers/WSW11320-USEn-00.pdf, May 2007.
Kurc et al., Querying Very Large Multi-dimensional Datasets in ADR, Proceedings of the 1999 ACM/IEEE SC Conference, SC 1999, Portland, OR, Nov. 1999.
Thies et al., StreamIt: A Language for Streaming Applications, International Conference on Compiler Construction, ICCC, Grenoble, France, Apr. 2002.
Vitter, Random Sampling with a Reservoir, ACM Transactions on Mathematical Software, 11:37-57, 1985.
Arasu et al., The CQL Continuous Query Language: Semantic Foundations and Query Execution, Technical Report, InfoLab—Stanford University, Oct. 2003.
Chakravarthy et al., Multiple Query Processing in Deductive Databases using Query Graphs, Proceedings of the 12th International Conference on Very Large Databases, Kyoto, Aug. 1986.
Pauw et al., Streamsight—A Visualization Tool for Large-Scale Streaming Applications, Symposium on Software Visualization, ACM Soft Vis, Herrsching am Ammersee, Germany, 2008.
Hadoop, http://hadoop.apache.org.
Emigh, Morningstar detangles options data, http://www.windowsfs.com/TheMag/tabid/54/articleType/ArticleView/articleId/2185/Morningstar-Detangles-Options-Data.aspx.
Wolf et al., SODA: An Optimizing Scheduler for Large-Scale Stream-Based Distributed Computer Systems, Technical Report RC 24453, IBM Research, Dec. 2007.
Tu et al., Load Shedding in Stream Databases: A Control-Based Approach, Very Large Data Bases Conference, VLDB, Sep. 2006.
Arasu et al., Stream: the Stanford Stream Data Manager, IEEE Data Engineering Bulletin, 26, 2003.
Chandrasekaran et al., TelegraphCQ: Continuous Dataflow Processing for an Uncertain World, Conference on Innovative Data Systems Research, CIDR, 2003.
Energy Information Administration, Electric power industry overview. http://www/eia.doe/gov/cneaf/electricity/page/prim2/toc2.html, Oct. 2007.
IBM WebSphere Front Office for Financial Markets, Version 3.0—WebSphere , http://www.ibm.com/software/integration/wfo, Oct. 2007.
StreamBase Systems http://www.streambase.com.
IBM Unstructured Information Management Architecture (UIMA), http://www.research.ibm.com/UIMA.
Wu et al., Challenges and Experience in Prototyping a Multi-Modal Stream Analytic and Monitoring Application on System S. Very Large Data Bases Conference, VLDB, 2007.

\* cited by examiner

FIG. 3

TRADE AND QUOTE (TAQ) DATA EXCERPT – SHOWING TRADE AND ASK QUOTE TRANSACTIONS

| TICKER SYMBOL | DATE | TIMESTAMP | TRANSACTION TYPE | PRICE | VOLUME | ASK PRICE | ASK SIZE |
|---|---|---|---|---|---|---|---|
| MWG | 30-DEC-2005 | 14:30:06.280 | TRADE | 24.27 | 500 | – | – |
| TEO | 30-DEC-2005 | 14:30:06.283 | QUOTE | – | – | 12.85 | 1 |
| UIS | 30-DEC-2005 | 14:30:06.286 | QUOTE | – | – | 5.85 | 6 |
| NP | 30-DEC-2005 | 14:30:06.298 | TRADE | 28.00 | 5700 | – | – |
| TEO | 30-DEC-2005 | 14:30:06.389 | TRADE | 12.79 | 700 | – | – |

```
for_begin @J 1 to NUMAGG                                    ⎤ 402 stream VWAPAggregator@K_@L_@J(
    tickersymbol : String,
    svwap        : Double,
    svolume      : Double)
    := Aggregate(TradeFilter@K_@L <count(WSIZE*@J), count(1) , pergroup>) [tickersymbol]
       { Any (tickersymbol), Sum (myvwap), Sum (volume) }          ⎤ PER GROUP
    -> partition["P@K_@L"], node(pool, @K)                         ⎦ MODIFIER stream VWAP@K_@L_@J(
    tickersymbol : String,
    cvwap        : Double)
    := Functor(VWAPAggregator@K_@L_@J) []
       { tickersymbol, (svwap/svolume) *100.0d }
    -> partition["P@K_@L"], node(pool, @K)

stream BargainIndex@K_@L_@J(
    tickersymbol : String,
    bargainindex : Double)
    := Join ( VWAP@K_@L_@J <count(1) , pergroup>; QuoteFilter@K_@L <count(0)> )
       [{tickersymbol}={tickersymbol}, cvwap > askptickersymbole*100.0d]   ⎤ PER GROUP
       { tickersymbol := $1.tickersymbol,                                  ⎦ MODIFIER
         bargainindex := exp(cvwap-askptickersymbole*100.0d)*asksize }
    -> partition["P@K_@L"], node(pool, @K)  ⎤
                                            ⎦ OPERATOR-FUSING AND PLACEMENT
for_end
```

METHOD FOR HIGH-PERFORMANCE DATA STREAM PROCESSING

STATEMENT OF GOVERNMENT RIGHTS

This invention was made with Government support under Contract No.: H98230-07-C-0383/Distillery Phase IV, awarded by Intelligence Agencies. The Government has certain rights in this invention.

FIELD OF THE INVENTION

The present invention generally relates to information technology, and, more particularly, to data stream processing.

BACKGROUND OF THE INVENTION

High performance stream processing is critical in many sense-and-respond application domains. In many cases, the number of distinct sub-streams on which one needs to perform group-independent aggregation and join operations are not known a priori (for example, environmental sensors may come online or might be turned off, securities may be added or removed from the stock market) and the logical sub-streams carrying state updates or individual enterprise transactions might be multiplexed in a single physical stream feed. Consequently, expressing queries on this data using existing relational stream processing algebra is often not possible or very costly, in particular when an application is processing streams with very high data rates as is common for stock market application, environmental sensors, etc.

Large scale sense-and-respond systems continuously receive external signals in the form of one or more streams from multiple sources and employ analytics aimed at detecting critical conditions to allow for reactive behavior potentially in proactive fashion. Examples of such systems can include SCADA (Supervisory Control And Data Acquisition) systems deployed for monitoring and controlling manufacturing, power distribution, and telecommunication networks, environmental monitoring systems, as well as algorithmic trading platforms. Sense-and-respond systems share the need for calculating baselines for multiple samples of incoming signals (for example, instantaneous electricity production levels, the fair price of a security, etc.) as well as the correlation of the computed value for a signal with other signals (for example, instantaneous electricity consumption levels, the ask (or offer) price of a security, etc.). The computation of baselines is typically performed by aggregating multiple samples based on a group-by aggregation predicate. Such an aggregation can, for example, be executed in different ways over different granularities by the establishment of a window over the incoming data.

This step can be referred to as the sensing portion of a system. On the other hand, the correlation operation is typically the result of a join operation, where two signals are paired, generally using a window over the incoming data streams, and the result is used to drive an automated response whereby, for example, a request for the generation of extra power is made or a block of securities is sold or bought. This operation corresponds to the responding portion of a sense-and-respond system. In many situations, the number of signals to be independently aggregated and correlated is very high. For example, stock market feeds can contain information about trading for thousands of different securities. A financial firm processing and acting on information gleaned from the US equity market, for example, must track more than 3000 different stocks and an even larger number of options on these stocks. Similarly, there are around 3000 power plants in the United States and millions of consumers. Streaming sense-and-respond systems must be able to cope with such a large influx of data.

In both examples, one can argue that the underlying architectural pattern representing these sense-and-respond streaming systems includes a large number of window-based aggregation operations coupled in some fashion with a large number of window-based join operations operating on a collection of distinct sub-streams. By way of example, in many cases, the number of distinct sub-streams might not even be known a priori (for example, securities may be added and/or removed from the market) and the logical sub-streams might be multiplexed in a single physical stream feed (for example, a Reuters Stock Market Data Feed). Consequently, expressing such queries in relational stream processing algebra is often not practical, or is very costly, due to the overhead created by the large number of resulting independent queries, as well as the need for updating the set of queries as sub-streams dynamically arrive and depart.

SUMMARY OF THE INVENTION

Principles of the present invention provide techniques for high-performance data stream processing.

An exemplary method (which may be computer-implemented) for optimizing data stream processing, according to one aspect of the invention, can include steps of employing a pattern, wherein the pattern facilitates splitting of one or more incoming streams and distributing processing across one or more operators, obtaining one or more operators, wherein the one or more operators support at least one group-independent aggregation and join operation on one or more streams, generating code, wherein the code facilitates mapping of the application onto a computational infrastructure to enable workload partitioning, using the one or more operators to decompose each of the application into one or more granular components, and using the code to reassemble the one or mote granular components into one or more deployable blocks to map the application to a computational infrastructure, wherein reassembling the one or more granular components to map the application to the computational infrastructure optimizes data stream processing of the application.

At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a diagram illustrating trade and quote (TAQ) data excerpt, according to an embodiment of the present invention;

FIG. 4 is a diagram illustrating a Stream Processing Application Declarative Engine (SPADE) code excerpt showing the volume-weighted average price (VWAP) calculation and the bargain detection implementation, according to an embodiment of the present invention;

DETAILED DESCRIPTION OF PREFERRED EMBODIMENTS

Figure 1:
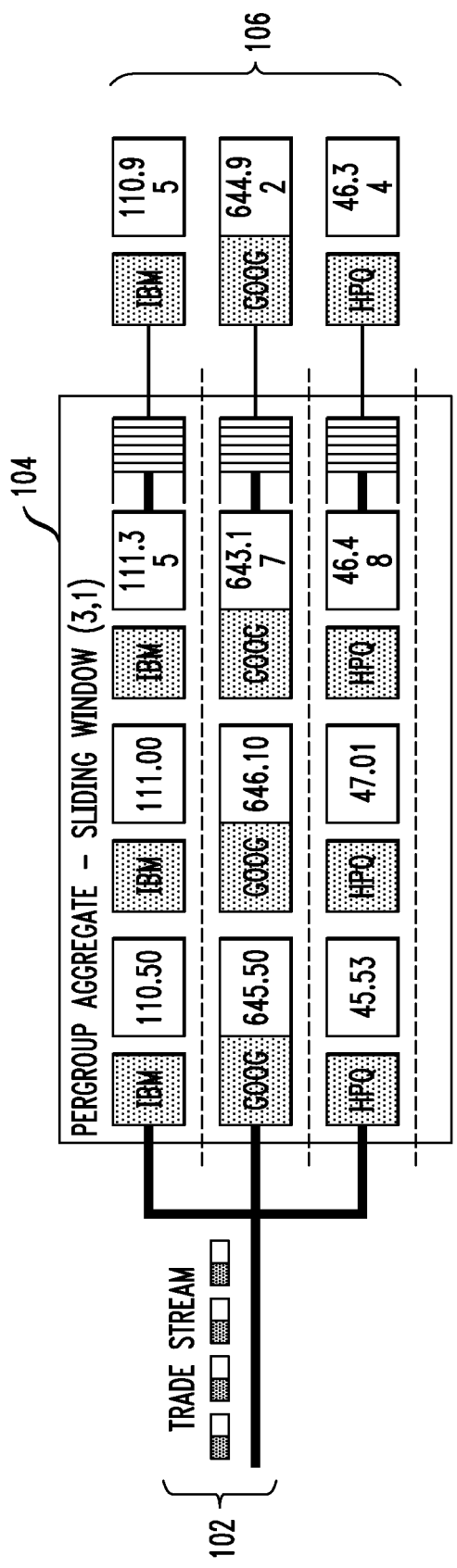
FIG. 1 is a diagram illustrating a per group aggregation operation, according to an embodiment of the present invention.

Principles of the present invention include techniques for optimizing high-performance data stream processing. One or more embodiments of the invention include techniques for improving the performance of aggregation and join operations as part of a common architectural pattern used in sense-and-respond applications for ingesting and analyzing data coming from high-rate live streams. Additionally, principles of the invention include processing and workload distribution based on the concept of per group processing to support multiple and simultaneous group-independent aggregation and join operations on streams, as well as a compiler-based code generation support that allows the mapping of a logical application onto distributed computational resources to enable flexible workload partitioning.

The techniques described herein correspond to high-performance stream processing, and include, for example, techniques for splitting the workload and processing of sense-and-respond type stream processing queries in a split, aggregate and join architectural pattern. Also, one or more embodiments of the invention include techniques for controlling the granularity of aggregate and join operators, using code generation to refine the level of processing granularity and workload processing distribution, and processing multiplexed data where the number of group components is not necessarily known a priori.

As noted herein, high-performance stream processing is advantageous in many sense-and-respond application domains (for example, from environmental monitoring to algorithmic trading in financial markets). As such, one or more embodiments of the present invention focus on language and run-time support for improving the performance of sense-and-respond applications in processing data from high-rate live streams. The techniques described herein include the Stream Processing Application Declarative Engine (SPADE) language, its workload splitting mechanisms, the code generation framework, and the underlying run-time system.

As described herein, a challenge exists in distributing the workload (for example, one or more primal streams) and the actual processing carried out by the application as to scale up as more computational resources are employed to address more demanding or increased workloads imposed by external sources (for example, additional sources or existing sources with higher data rates). As such, one or more embodiments of the invention include a split, aggregate and join architectural pattern in a distributed stream processing system, as well as techniques, based on the concept of per group processing, for efficiently performing independent aggregate and join operations on a large number of independent multiplexed substreams. Such an approach can be, for example, based on creating granular processing chains in a flexible way.

As described herein, an application architectural pattern can be characterized to enable one to design a programming framework, including a language, an optimization framework, and run-time support that allow application writers to focus on the application analytics as opposed to parallelization and distributed computing plumbing. Additionally, one or more embodiments of the invention include language and code generation support, including, for example, a streaming application decomposition methodology as well as the compile-time knobs required for efficiently mapping a logical application onto physical resources. Such a methodology relies on the ways architected in the language for partitioning the live data ingestion and processing workload into granular pieces (for example, stream splitting, and per-group aggregation and join operators) such that one can map the logical application onto the underlying computational environment (for example, by using code generation and operator-fusing techniques).

By way of example, one can implement a realistic stock market trading application reliant on the split, aggregation and join pattern.

As noted herein, one or more embodiments of the invention include processing multiplexed independent sub-streams. The initial operation typically performed by stream processing systems is data ingestion. This operation relies on an edge adapter that converts a data feed of incoming packets into stream data objects (or tuples) for processing. Usually, a limited amount of data cleaning, data conversion and data transformation is also performed during data ingestion. An edge adapter may create one or more data streams as it may employ a channelization method, whereby a fat physical stream can be split into a collection of thinner streams, for example, using multiple user datagram protocol (UDP) multicast groups. The tuples flowing on each of these streams are usually logically related (for example, trade transactions of IBM stock). Another common approach is to employ a pub-sub system or enterprise service bus to encapsulate and route the data from the physical feed to the downstream data consumers.

In most cases, physical as well as logical channels carry messages and/or tuples that are associated with different groups. For example, in processing trading market data, a financial firm must acquire a market feed such as, for example, Bloomberg B-Pipe. The market feed will then be ingested using one of the approaches that were delineated above. Assuming that the firm is interested only in trades from the NASDAQ stock exchange, one or more channels will be created and each will contain independent transactions. In this case, logical or physical channels will be created for splitting the incoming traffic for load balancing (for example, ticker symbols starting with A, B, and so on) or categorically partitioning the traffic (for example, biotech companies, optics companies, etc.). Note that each of these channels (refer to from this point on as streams) contain data belonging to different groups. For example, a stream carrying transactions related to "ticker symbol starting with the letter A" will include trading data on multiple companies such as Agilent (A), Alcoa (AA), among others. In this example, each company can be referred to as a group, because trading analytics and activities will take place on stocks belonging to a particular company.

One or more embodiments of the invention also include defining a split, aggregate and join architectural pattern. Given a particular stream where data belonging to multiple groups is multiplexed together, a sense-and-respond system will initially de-multiplex the incoming data into a collection of physical streams, aggregate data from multiple groups while, at the same time, correlate (by joining) the aggregates with other data coming from the same or other groups. In the example above, different company stocks were used as groups. Groups can contain collections, such as all companies that operate in the mining sector or power plants that are part of the Northeast Power Coordinating Council (NPCC) region of the US Power Grid, etc. As stated herein, the number of groups is not necessarily known beforehand. For example, a newly listed company may become part of the mining sector in the stock market or a particular stock may be traded only sporadically.

In terms of relational algebra, the implementation of these operations can require, for example, filtering to be carried out by a selection operator to perform the de-multiplexing, creating the sub-stream for a particular group, as well as independent aggregation to be carried out by an aggregate function, and joining sub-streams to be carried out by a join operator. If one is performing the split/aggregation/join for different groups, one will have a collection of chains, each one for a different group. The term collection is emphasized because a complication arises when the number of groups is not known beforehand. In this example, it is not possible to create the collection of independent query networks a priori.

The techniques described herein include a per group operator modifier to create independent processing buckets. Existing approaches in the state-of-the-art are based on relational operators and suffer from two major shortcomings. First, as pointed out, one must know the number of groups and their keys a priori. The second, and a more fundamental flaw, is the fact that the query network grows with the number of groups. In other words, supporting a new group requires adding new filtering operators, new aggregators, and new joins. Given this situation, it is clear that for many applications, the scaling up costs can be steep. Due to the independent processing of the different chains, one can see that the problem is embarrassingly parallel, highlighting the importance of early-on splitting in the architectural pattern.

Also, it can be seen that the filtering that precedes the processing is performed on the group-by attribute. On the other hand, the windowing characteristics of both the aggregation and the join operator apply independently to each group. For example, the computation of the moving average trading price for the IBM stock over the last 20 transactions is independently triggered by the arrival of a new trade transaction of the IBM stock. Therefore, while a single aggregate operator can be used for making the same computation for different groups in a typical relational query, aggregation and join operations in streaming scenarios typically rely on a window for determining when the operation is complete (for example, the tuples received in the last five minutes for a time-based window, or the last 10 trade transaction tuples for a count-based window).

A window, however, is intimately related to a group, as it triggers additional processing or termination of processing based on the tuples that have been accumulated for one particular group. As an example, if a new trade on the IBM stock arrives, it triggers a change in the moving average for the IBM stock alone. The same reasoning applies to processing isolation necessary for stream join operators.

What is needed, therefore, is the ability to have the aggregate and join operators simultaneously operate on different groups in a compartmentalized fashion, creating independent buckets for processing. In this scenario, as described herein, the filtering can be done efficiently by simply hashing on the aggregate group key and the aggregate operator can independently compute the aggregations for the different groups as the windowing boundaries apply independently to the different groups. One can achieve this by adding a per group modifier to the windowing support in both the aggregate and join operators. The per group modifier in creating the independent buckets for data processing also automatically solves the problem of an unknown number of logical streams. A previously unknown sub-stream will automatically be appropriately routed to operators implementing instances of an aggregate or join operations as those instances will automatically create a new bucket based on the previously unknown value for the per group attribute.

FIG. 1 is a diagram illustrating a per group aggregation operation, according to an embodiment of the present invention. By way of illustration, FIG. 1 depicts the elements of a trade stream 102, a per group aggregate 104, and, in this example, the computation of a stock average price for the last three trade transactions of that stock 106. In this example, only three stock symbols are shown and a 3-trade transaction sliding window is depicted. These independent windows (maintained by the pet group version of the aggregate operator) can carry out a moving average computation for the stock price. Effectively, this modifier logically creates multiple independent windows, one per group. The actual implementation employs the group by attribute to segment the processing in the aggregate operator, as seen in FIG. 1, and the equi-join attribute to segment the processing for the join operator.

In general, the problem of deploying an application query network depends on how to effectively distribute the individual processing chains on a stream data processing platform. A number of questions must be solved at planning time. For example, how many different stream engine containers should be employed, how many operators should run in each stream engine, how should one perform internal operator scheduling within each engine, and how many nodes should be employed for performing the computation. Such questions are subjected to the underlying computational architecture hosting the stream processing system. Indeed, this is one of the critical problems facing the system infrastructure of companies that will employ a distributed middleware for stream processing. As described herein, the per group support is only as effective as how well one can distribute the processing load across processors and computational nodes. Note that employing the per group modifier greatly reduces the number of operators that must be deployed, simplifying both the planning phase as well as the query execution management.

As described herein, one or more exemplary embodiments of the present invention are demonstrated and explained in the context of (but not limited to) IBM's System S platform. System S is a large-scale, distributed data stream processing middleware. It can support structured as well as unstructured data stream processing and can be scaled to a large number of compute nodes. The System S run-time can execute a large number of long-running jobs (queries) that take the form of data-flow graphs. A data-flow graph includes a set of processing elements (PEs) connected by streams, where each stream carries a series of stream data objects (SDOs). The PEs implement data stream analytics and are basic execution containers that are distributed over the compute nodes. The compute nodes can be organized, for example, as a shared-nothing cluster of workstations (COW) or as a large supercomputer (for example, Blue Gene). The PEs communicate with each other via their input and output ports, connected by streams. Also, the PE ports, as well as streams connecting them, can be typed.

PEs can be explicitly connected using hard-coded links or through implicit links that rely on style schema compatibility. The latter type of connection is dynamic and allows System S to support incremental application development and deployment. Besides these fundamental functionalities, System S provides several other services such as, for example, fault tolerance, scheduling and placement optimization, distributed job management, storage services, and security, etc.

Additionally, one or more embodiments of the invention are demonstrated and explained in the context of (but not limited to) Stream Processing Application Declarative Engine (SPADE), a declarative stream processing engine of System S, as well as the name of the declarative language used to program SPADE applications. SPADE provides a rapid application development (RAD) front-end for System S. Concretely, SPADE offers an intermediate language for flexible composition of parallel and distributed data-flow graphs. SPADE provides toolkits of type-generic built-in stream processing operators. SPADE supports all basic stream-relational operators with rich windowing and punctuation semantics as well as stream manipulation operators such as splitting. It also seamlessly integrates built-in operators with user-defined ones. Additionally, SPADE provides a broad range of stream edge adapters. These adapters can be used to ingest data from outside sources and publish data to outside destinations such as, for example, network sockets, relational and extensible markup language (XML) databases, file systems, as well as proprietary platforms.

In one or more embodiments of the invention, the SPADE language provides a stream-centric, operator-level programming model. The stream-centric design implies building a programming language where the basic building block is a stream. In other words, an application writer can quickly translate the flows of data she anticipates from a block diagram prototype into the application skeleton by simply listing the stream data flows. The second aspect, that is, operator-level programming, is focused on designing the application by reasoning about the smallest possible building blocks that are necessary to deliver the computation an application is supposed to perform. For example, database engineers typically design their applications in terms of the operators provided by the stream relational algebra.

Figure 2:
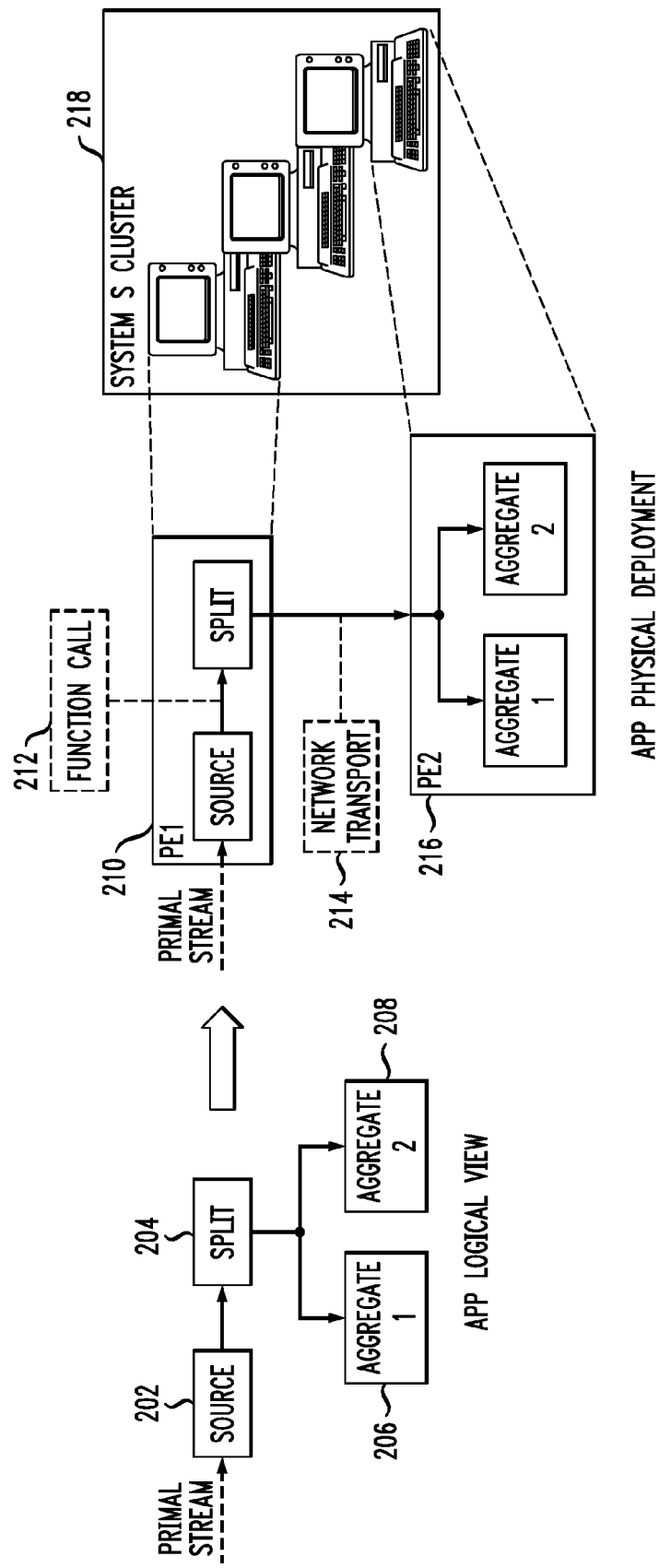
FIG. 2 is a diagram illustrating an application in terms of functional operators and its corresponding physical deployment layout, according to an embodiment of the present invention.

The techniques described herein include a compiler and run-time support SPADE leverages the existing stream processing infrastructure offered by System S. Given an application specification in the SPADE language, the SPADE compiler generates optimized code that will run on System S as a native application as illustrated in FIG. 2. FIG. 2 is a diagram illustrating an application in terms of functional operators and its corresponding physical deployment layout, according to an embodiment of the present invention. By way of illustration, FIG. 2 depicts the elements of a source edge adapter 202, a split operator 204, an aggregate operator #1 206, an aggregate operator #2 208, a processing element (PE 1) 210 (which hosts source and split components), function call 212, the network transport 214, a processing element (PE 2) 216 (which hosts aggregate 1 and aggregate 2) and System S cluster 218. Processing elements are the code execution containers employed by System S.

SPADE's code generation and optimization framework leverages the split, aggregate and join architecture pattern, and enables it to fully exploit the performance and scalability of System S by flexibly breaking the processing as to match the underlying computation environment. In other words, the same logical application may originate different physical deployment plans, where the granular programming language components are reassembled into a set of processing element containers matching the computational resources and traffic workload. The reliance on code generation provides the ability to create highly optimized platform- and application-specific code. In contrast to traditional database query compilers, the SPADE compiler outputs code that is tailored to an application as well as system-specific aspects such as, for example, the underlying network topology, the distributed processing topology for the application (that is, where each piece will run), and the computational environment. In one or mole embodiments of the invention, applications created with SPADE are long-running queries. As such, the long run-times can amortize the build costs.

As stated herein, SPADE uses a code generation to fuse operators into PEs. The PE code generator produces code that fetches tuples from the PE input buffers and relays them to the operators within, receives tuples from operators within and inserts them into the PE output buffers, and for all the intra-PE connections between the operators, it fuses the outputs of operators with the inputs of downstream ones using function calls. This fusion of operators with function calls results in a depth-first traversal of the operator sub-graph that corresponds to the partition associated with the PE, with no queuing involved in-between. In other words, when going from a SPADE program to the actual deployable distributed program (seen in the right-side diagram in FIG. 2), the logical streams seen in the left-side diagram of FIG. 2 may be implemented as simple function calls (for fused operators) to pointer exchanges (across PEs in the same computational node) to network communication (for PEs sitting on different computational nodes). This code generation approach allows that through simple recompilation one can go from a fully fused application to a fully distributed one or anywhere in between, adapting to different ratios of processing to I/O provided by different computational architectures (for example, blade centers versus a supercomputer such as, for example, the IBM Blue Gene). Also, in one or mote embodiments of the invention, fusing is controlled through compiler directives and primitives in the SPADE code.

By way of example, many financial market data processing applications can be described based on the split/aggregation/join architectural pattern as they fit a mold where one must first build predictive models for asset pricing or risk management and, later, correlate model results with incoming, live data and, thus, drive a trading platform to execute sell or buy orders.

An exemplary application can, for example, ingest trade and quote (TAQ) data from a stock exchange. A sample snippet of this data can be seen in FIG. 3, which is a diagram illustrating a trade and quote (TAQ) data excerpt table 302, according to an embodiment of the present invention.

In particular, the data is a sequence of trade and quote transactions, where trade transactions are characterized by the price of an individual security and the number of securities that were acquired and/or sold. On the other hand, quote transactions can either be a bid or an ask quote. A bid quote refers to the price a market maker (that is, a firm that trades securities) will pay to purchase a number of securities and an ask quote refers to the price a market maker will sell a number of securities for.

Figure 5:
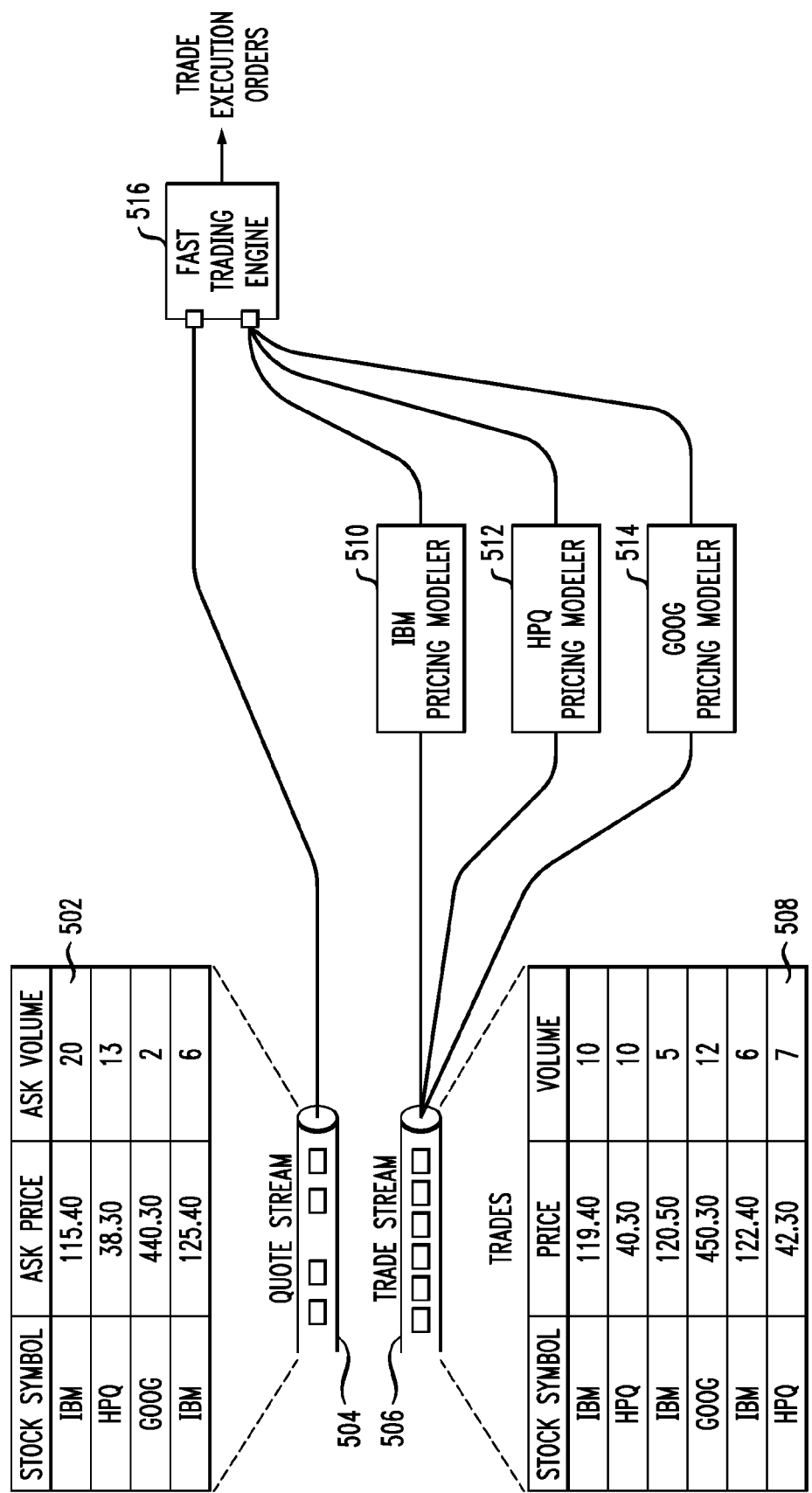
FIG. 5 is a diagram illustrating a sample application and exemplary stream flows, according to an embodiment of the present invention.

FIG. 4 is a diagram illustrating a SPADE code excerpt 402 showing the implementation of a sample stream processing application whose goal is to spot bargains in the stock market by comparing quotes with the theoretical fair price for the individual stocks traded in a particular exchange, according to an embodiment of the present invention. FIG. 5 is a diagram illustrating a sample application and exemplary stream flows, according to an embodiment of the present invention. By way of illustration, FIG. 5 depicts the elements of a quote table 502, a quote stream 504, a trade stream 506, a trade table 508, IBM pricing modeler 510, HPO pricing modeler 512, GOOG pricing modeler 514 and a fast trading engine 516.

As depicted in FIG. 5, in one ox more embodiments of the invention, the split/aggregation/join pattern can show up in a sense-respond-system, summarize data, and find outliers and react via data analytics.

An advantage of the techniques described herein to optimize the split, aggregation and join architectural pattern is that they are fairly resilient to load imbalances. To identify a bargain, the firm first needs to acquire data to build a model for pricing all (or some of) the securities that are being traded. Once a security is priced (for example, a fair price), the firm can assess whether the ask quotes are mis-priced. That is, it must verify whether a seller is willing to sell that security (or a bundle of those) by a price that is lower than the fair price as predicted by the pricing model. The incoming primal stream carries all the information necessary for performing such algorithm.

Figure 6:
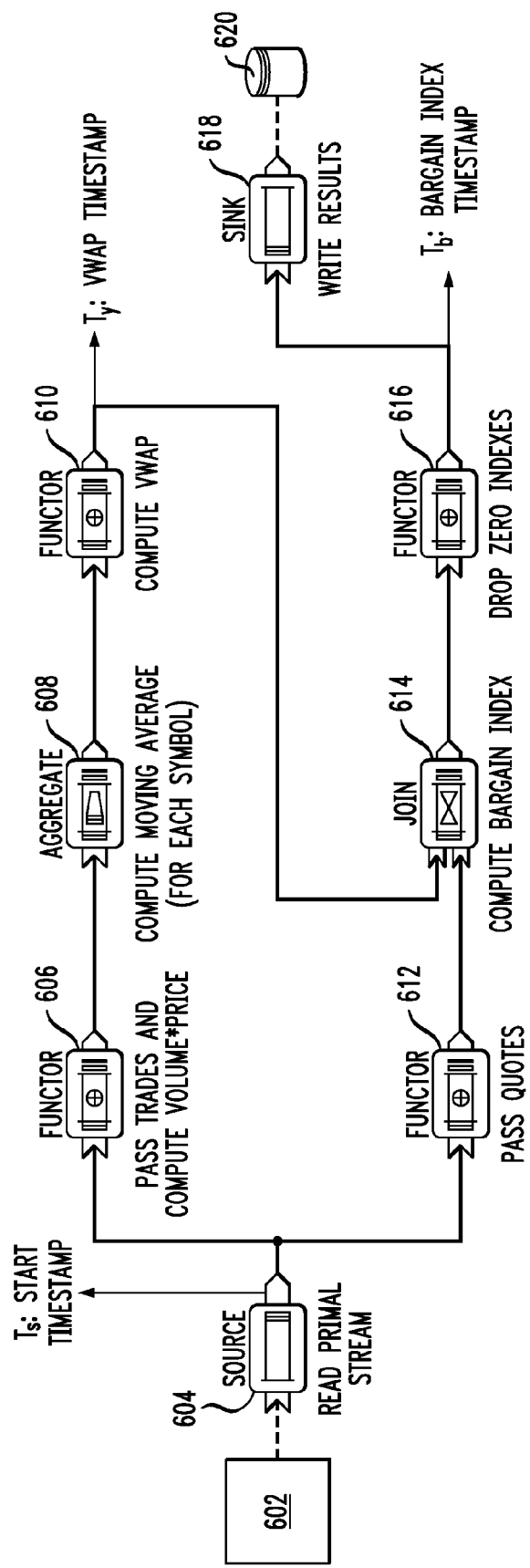
FIG. 6 is a diagram illustrating a bargain discovery application in terms of SPADE operators, according to an embodiment of the present invention.

FIG. 6 is a diagram illustrating a bargain discovery application implemented using the split/aggregation/join architectural pattern, according to an embodiment of the present invention. By way of illustration, FIG. 6 depicts the elements of a data stream coming of the stock market 602, a source edge adapter that converts market data, trades and quote transactions into SPADE tuples 604, a functor operator for filtering trade transactions 606, an aggregate operator to compute moving averages for stock trades 608, a functor operator to finalize the computation of stock trades moving average 610, a functor operator to filter quote transactions 612, a join operator to prospect for bargains by correlating trade average prices and quotes 614, a functor operator to format output results 616, a sink edge adapter to externalize the set of bargains that have been spotted 618 and a repository of bargains to be acted upon by an automated trading platform 620.

FIG. 6 depicts a simplified view of the application in terms of SPADE's stream-relational operators. The primal stream is first split into two sub-streams, a trade stream and a quote stream, originating two separate processing chains. The trade stream is used to feed the pricing model with recent trades. The pricing model employs a simple moving average approach for assessing the fair price for a security. This moving average, commonly referred as VWAP (Volume Weighted Average Price), is calculated by adding up the dollars traded for every transaction (price multiplied by number of shares traded) and then dividing by the total shares traded for a specific trading window. Typically, trading windows of different sizes are employed to capture long-term to short-term changes in pricing.

In one or more embodiments of the present invention, one can simultaneously compute the VWAP for every single security using three different window sizes, the last five trade transactions, the last 10, and the last 15. The SPADE code excerpt can be seen in FIG. 4. The actual VWAP computation can be carried out using a sliding window with a slide factor of one. During this portion of the computation, one can employ the SPADE per group construct for simultaneously performing the same computation for different stock symbols traded in the market.

As stated herein, the application is running the pricing model for all securities that are being traded. In principle, a single aggregate operator can carry out that computation as the per group construct essentially creates different and isolated buckets for each different security, as depicted in FIG. 1.

One or more embodiments of the invention also illustrated that the per group construct also enables one to split the computation across different processing chains through simple hashing, replicating the processing chain for different groups of securities, achieving very good scalability. The join operation is driven by the arrival of a new quote transaction. Its other input is fed by the last and most recently computed VWAP value. The SPADE join operator can operate on windows and the windowing specification is particular to each input to the operator. Therefore, for a VWAP processing chain, a window of size one is employed (for keeping the last computed fair price for a security) and no windowing is employed for the quote processing chain (that is, a window of size 0) as one wants to process the incoming quote transactions as they arrive.

Note that, again, the per group construct is used in the join operator as well to make sure that one can perform this correlation independently and simultaneously for every stock symbol as also illustrated in FIG. 4. The join operator also computes a bargain index which considers both the price difference between the quoted price and the fair price as well as the volume to be sold as specified by the quote transaction.

Figure 7:
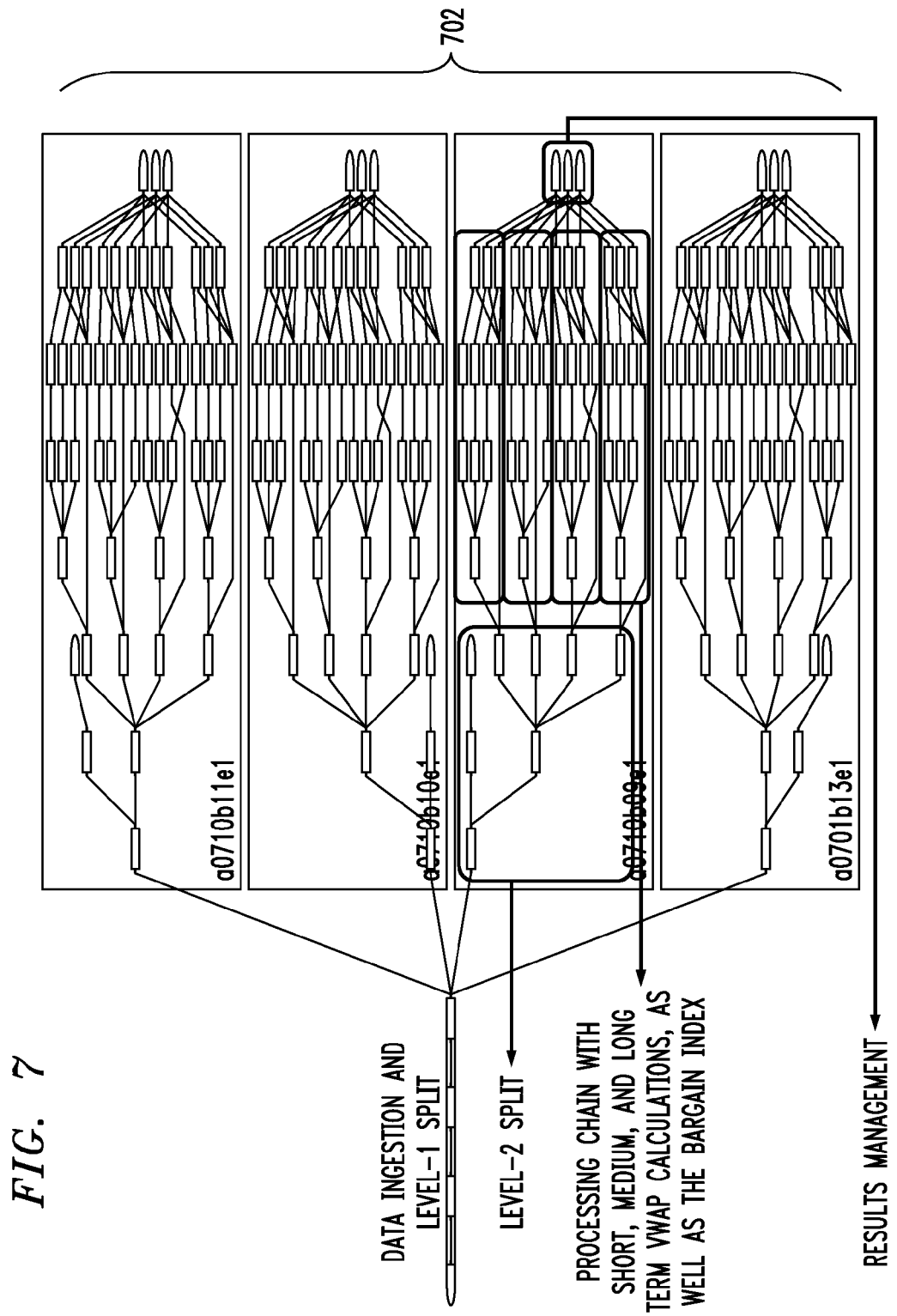
FIG. 7 is a diagram illustrating a large-scale operator-based processing graph, according to an embodiment of the present invention.
Figure 8:
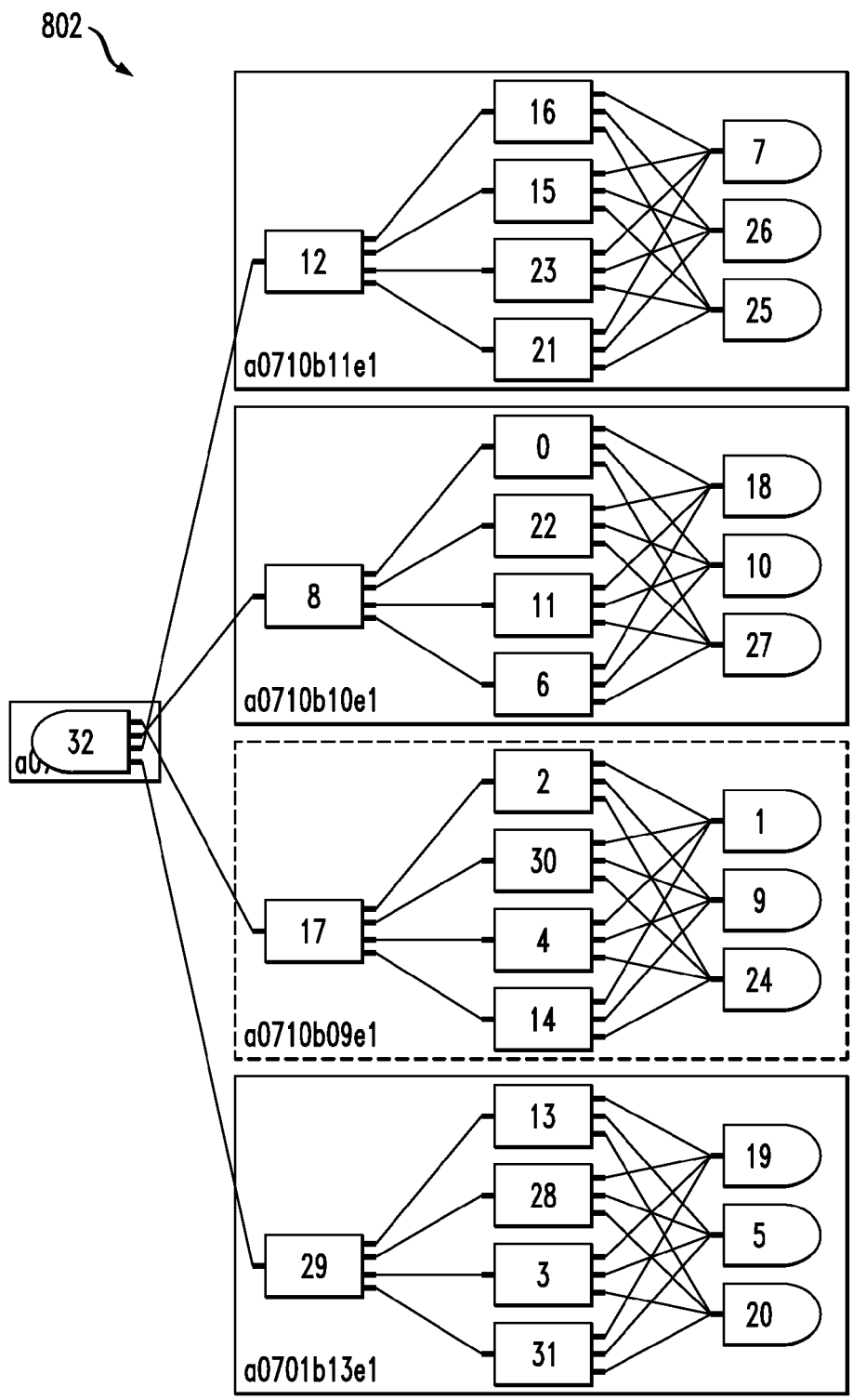
FIG. 8 is a diagram illustrating the processing element (PE) processing graph, according to an embodiment of the present invention.

FIG. 7 is a diagram illustrating a large-scale operator-based processing graph 702, according to an embodiment of the present invention. FIG. 8 is a diagram illustrating the processing element (PE) processing graph 802, according to an embodiment of the present invention, depicting how the logical application is mapped on a set of compute nodes in an ordinary cluster of workstations.

FIG. 7 and FIG. 8 show two depictions of the application processing graphs that were actually deployed. The application can be depicted in terms of SPADE operators (FIG. 7) as well as in terms of actual processing elements (FIG. 8), the logical and physical view as conceptually depicted in FIG. 2. Contrasting the two images allows one to observe the effects of operator fusion carried out by the SPADE compiler. In both cases, a configuration is shown where the primal stream is split four-ways to feed independent processing chains residing on four distinct nodes.

Further, in connection with distributed computing middleware, there are advantages in using the SPADE model described herein. For example, from an application writer's standpoint, a developer will concentrate on the analytics and not worry about distributed computing plumbing. As described herein, the knobs for controlling the compile-time fusion of operators as well as placement of application components can be used in one or more embodiments of the present invention.

Also, in the relational data processing world, frameworks focus on providing a declarative language for writing applications, while less focus is on the distributed nature of the problem and on mapping the computation onto the underlying large-scale distributed environment. Unlike the techniques described herein, existing approaches do not give the developer the language constructs or the compiler optimization knobs to write the application in a granular way to truly leverage the levels of parallelism available in modern architectures.

On the programming language side, existing approaches focus on implementing stream flows for digital signal processing (DSP)-based applications, and do not have a distributed computing underpinning. In contrast, one or more embodiments of the present invention are organized in terms of high-level operators, forming toolkits (for example, the relational algebra toolkit used in the sample application described herein) that can be extended with an additional operator, supports user-defined operators, and includes a compiler that generates code and, hence, can customize the run-time artifacts to the characteristics of the runtime environment, including architecture-specific and topological optimizations. Existing approaches, additionally, rely on low-level programming constructs, analytics are written from scratch as opposed to relying on built-in, granular, operators.

As described herein, one or mote embodiments of the present invention include a split/aggregation/join architectural pattern that is a common template for implementing stream processing applications in different domains. In many cases, such as, for example, in the financial domain, scalable and high performance enterprise logic translates directly into actual financial returns, as the first one to spot a trading opportunity has the advantage. Therefore, the optimization of such an architectural pattern is advantageous.

Additionally, as noted above, the techniques described herein can include support for distributed stream processing. The ability to deploy an application on a large number of processing nodes is advantageous for providing the ability to achieve scalability as one distributes the incoming load from external data sources across different processing chains and nodes. Also, one or mote embodiments of the invention include operator-based language. From the standpoint of writing an application, developers typically think in terms of operators and how they interconnect (a common approach in other data analysis software platforms, such as general-purpose statistical packages and simulation packages). In one or more embodiments of the invention, the support for operators and for operator fusing facilitates finding a physical deployment configuration that permits one to fully utilize the underlying computational nodes.

The techniques described herein can also include per-group modified operators. The construct allows one to substantially simplify the application, reducing the total number of operators, in particular, join and aggregate operators necessary to carry out the computation. Moreover, this construct allows one to have the flexibility in breaking down the processing to any level of granularity that was adequate as far as fully utilizing the available computational nodes.

As detailed herein, one or more embodiments of the invention include a split/aggregation/join architectural pattern, per group processing to support multiple and simultaneous group-independent aggregation and join operations on streams, as well as compiler-based code generation support that allows the mapping of a logical application onto distributed computational resources to enable flexible workload partitioning.

Figure 9:
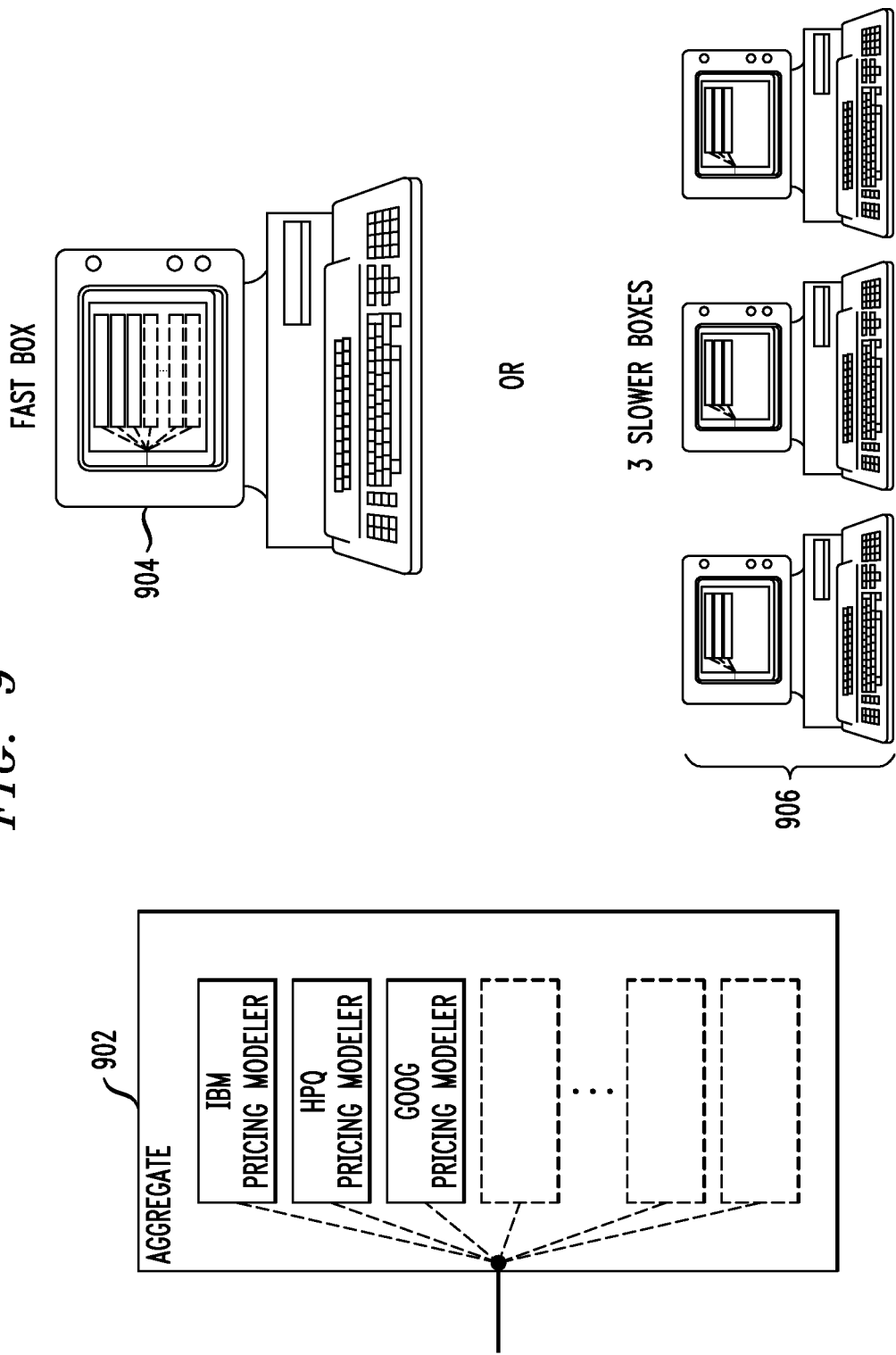
FIG. 9 is a diagram illustrating code generation, according to an embodiment of the present invention.

FIG. 9 is a diagram illustrating code generation, according to an embodiment of the present invention. By way of illustration, FIG. 9 depicts an aggregate operator 902 (which can include, for example, an IBM pricing modeler, an HPQ pricing modeler, a GOOG pricing modeler, etc.), a fast box 904 and three slower boxes 906.

As illustrated in FIG. 9, one or more embodiments of the invention can include different processing nodes capabilities as well as different inter-processing node bandwidth. Also, the same logical application can have different physical deployments. Further, code generation enables one to physically reassemble an application in different ways. For example, the same logical SPADE code can give rise to different physical implementations. Also, a per group modifier allows one to finely tweak the granularity of aggregate and join operators (for example, more or less stock symbols may be processed by a single operator).

Figure 10:
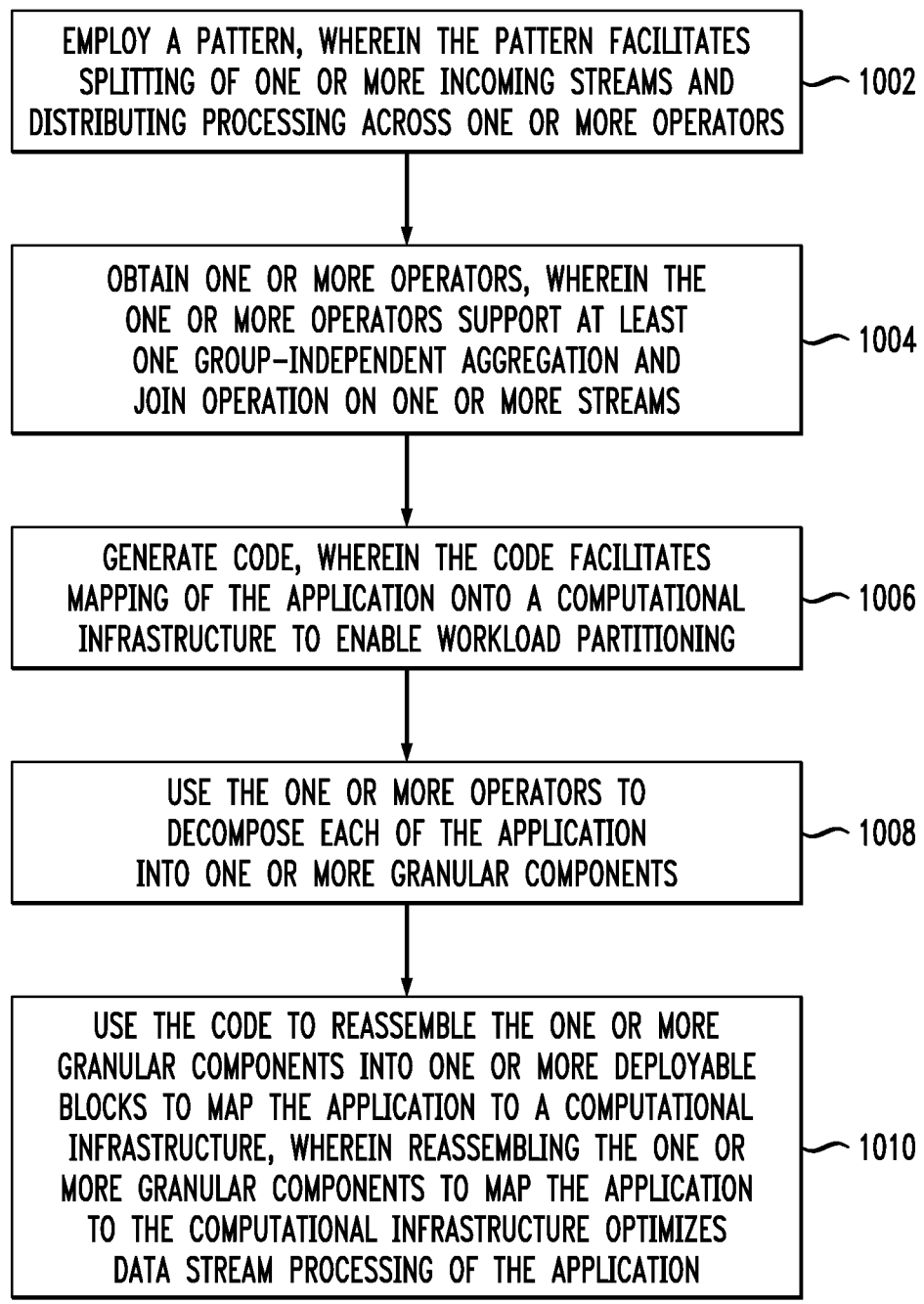
FIG. 10 is a flow diagram illustrating techniques for optimizing data stream processing, according to an embodiment of the present invention.

FIG. 10 is a flow diagram illustrating techniques fox optimizing data stream processing, according to an embodiment of the present invention. Step 1002 includes employing a pattern (for example, a split, aggregate and join architectural pattern), wherein the pattern facilitates (for example, guides an application writer in) splitting of one or mole incoming streams and distributing processing across one or more operators (for example, across a graph of logical operators). One or more embodiments of the invention include structuring an application according to an architectural pattern, wherein the pattern represents how the application is logically assembled.

Step 1004 includes obtaining one or more operators (for example, per group operators), wherein the one or more operators support at least one (for example, simultaneous) group-independent aggregation and join operation on one or more streams. Step 1006 includes generating code (for example, compiler-based code), wherein the code facilitates mapping of the application onto a computational infrastructure (for example, a distributed computational resource) to enable workload partitioning as to distribute the processing workload across the computational resources.

Step 1008 includes using the one or more operators to decompose each of the application into one or more granular components. Step 1010 includes using the code to reassemble the one or more granular components into one or more deployable blocks (for example, larger blocks) to map the application to a computational infrastructure, wherein reassembling the one or more granular components to map the application to the computational infrastructure optimizes data stream processing of the application.

The techniques depicted in FIG. 10 can also include providing language and code generation support (for example, a streaming application decomposition methodology). Language and code generation support can include, for example, compile-time knobs for efficiently mapping a logical application onto physical resources.

Additionally, one or more embodiments of the invention can include providing a compiler and run-time support, wherein the compiler can output code that is tailored to the application in question and system-specific aspects. System-specific aspects can include, for example, an underlying network topology, a distributed processing topology for the application and a computational environment as well as metrics collected during earlier runs of the application.

One or more embodiments of the invention also include techniques for splitting workload and processing in a sense-and-respond type stream processing system of at least one application in a split, aggregate and join architectural pattern (for example, in a distributed environment). Such techniques can include obtaining at least one application in a sense-and-respond type stream processing system, structuring the at least one application using a split, aggregate and join architectural pattern, and using a per group technique to split workload and processing into two or mote multiple independent chains of computation.

One or more embodiments of the invention can also include extending a stream relational aggregate and join to one or more operators with a per group modifier to express windowed group processing isolation. Additionally, one or mote embodiments of the invention include per group aggregate and join to one or more operators. Per group aggregate and join to operators can, for example, create, in an automatic fashion, a new bucket based on a previously unknown value for the per group attribute, maintaining individual windows and data structures for each aggregation bucket in an aggregate operator, maintaining individual windows and data structures for each equi-join bucket in a join operator, and operating independently on the windows and data structures corresponding to each aggregation bucket and join bucket.

Also, the techniques described herein can include using code generation to refine a level of processing granularity. Using code generation to refine the level of processing granularity can include, for example, mapping a logical implementation of an application to a physical deployment plan. Further, one or more embodiments of the present invention can include using the split, aggregate and join architectural pattern to efficiently execute applications where the number of groups is not known a priori.

A variety of techniques, utilizing dedicated hardware, general purpose processors, software, or a combination of the foregoing may be employed to implement the present invention. At least one embodiment of the invention can be implemented in the form of a computer product including a computer usable medium with computer usable program code for performing the method steps indicated. Furthermore, at least one embodiment of the invention can be implemented in the form of an apparatus including a memory and at least one processor that is coupled to the memory and operative to perform exemplary method steps.

Figure 11:
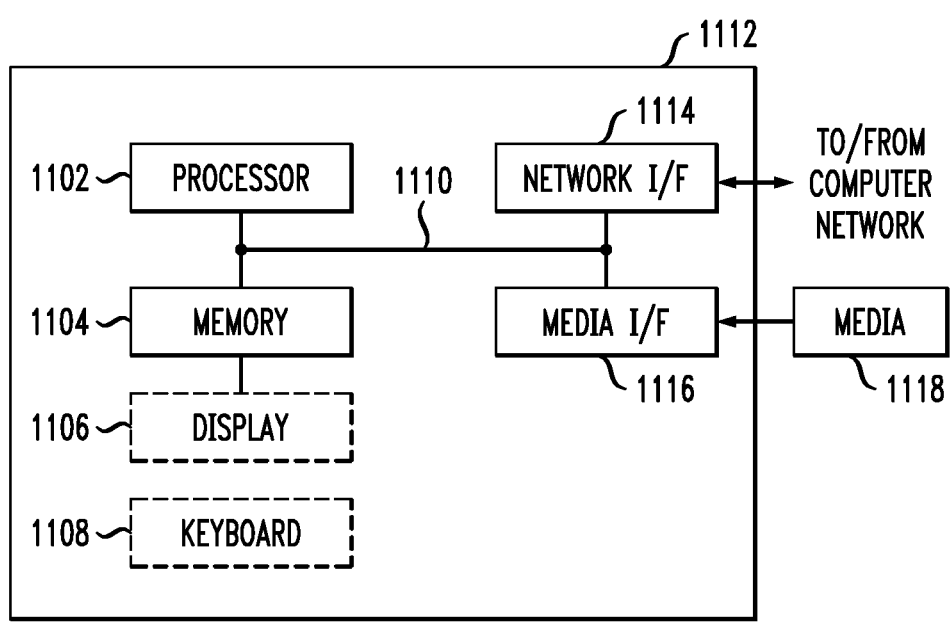
FIG. 11 is a system diagram of an exemplary computer system on which at least one embodiment of the present invention can be implemented.

At present, it is believed that the preferred implementation will make substantial use of software running on a general-purpose computer or workstation. With reference to FIG. 11, such an implementation might employ, for example, a processor 1102, a memory 1104, and an input and/or output interface formed, for example, by a display 1106 and a keyboard 1108. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 1102, memory 1104, and input and/or output interface such as display 1106 and keyboard 1108 can be interconnected, for example, via bus 1110 as part of a data processing unit 1112. Suitable interconnections, for example via bus 1110, can also be provided to a network interface 1114, such as a network card, which can be provided to interface with a computer network, and to a media interface 1116, such as a diskette or CD-ROM drive, which can be provided to interface with media 1118.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1118) providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example, memory 1104), magnetic tape, a removable computer diskette (for example, media 1118), a random access memory (RAM), a read-only memory (ROM), a rigid magnetic disk and an optical disk. Current examples of optical disks include compact disk-read only memory (CD-ROM), compact disk-read and/or write (CD-R/W) and DVD.

A data processing system suitable for storing and/or executing program code will include at least one processor 1102 coupled directly or indirectly to memory elements 1104 through a system bus 1110. The memory elements can include local memory employed during actual execution of the program code, bulk storage, and cache memories which provide temporary storage of at least some program code in order to reduce the number of times code must be retrieved from bulk storage during execution.

Input and/or output or I/O devices (including but not limited to keyboards 1108, displays 1106, pointing devices, and the like) can be coupled to the system either directly (such as via bus 1110) or through intervening I/O controllers (omitted for clarity).

Network adapters such as network interface 1114 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least one embodiment of the invention may provide one or more beneficial effects, such as, for example, per group processing for efficiently performing independent aggregation and/or join operations on a large number of independent multiplexed sub-streams.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for optimizing data stream processing, comprising the steps of:
   employing a split, aggregate and join architectural pattern on an application, wherein the pattern facilitates splitting of one or more incoming streams and distributing processing of the application across multiple per-group operators, wherein each of the one or more incoming streams contain data belonging to multiple groups multiplexed together, and wherein the number of groups is not known a priori;

employing the multiple per-group operators to perform multiple simultaneous group-independent split, aggregation and join operations on the one or more streams via (i) de-multiplexing the data from the one or more incoming streams into multiple physical streams, each physical stream corresponding to one of the multiple groups, (ii) aggregating data from the multiple groups to form multiple aggregates and (iii) joining the multiple aggregates with additional data incoming from a same and one or more other groups, and wherein said employing the multiple per-group operators comprises applying a distinct window for performing the simultaneous group-independent split, aggregation and join operations for each of the multiple groups, wherein each said distinct window triggers performance of said operations and termination of the performance of said operations based on the tuples that have been accumulated for the corresponding group;

generating code, wherein the code facilitates mapping of the application onto a computational infrastructure to enable workload partitioning;

using the multiple per-group operators to decompose the application into one or more granular components;

using the code to reassemble the one or more granular components into one or more deployable blocks to map the application to the computational infrastructure, wherein reassembling the one or more granular components to map the application to the computational infrastructure optimizes data stream processing of the application; and refining the level of granularity associated with the one or more granular components based on said computational infrastructure.

2. The method of claim 1, further comprising providing language and code generation support.

3. The method of claim 2, wherein the language and code generation support comprise a streaming application decomposition methodology.

4. The method of claim 2, wherein the language and code generation support comprise one or more compile-time knobs for efficiently mapping a logical application onto at least one physical resource.

5. The method of claim 1, further comprising providing a compiler and run-time support, wherein the compiler outputs code that is tailored to the at least one application and at least one system-specific aspect.

6. The method of claim 5, wherein the at least one system-specific aspect comprises at least one of an underlying network topology, a distributed processing topology for the at least one application and a computational environment.

7. The method of claim 1, further comprising splitting workload and processing in a sense-and-respond type stream processing system of at least one application in a split, aggregate and join architectural pattern, wherein splitting workload and processing in a sense-and-respond type stream processing system comprises the steps of:

obtaining at least one application in a sense-and-respond type stream processing system;

structuring the at least one application using a split, aggregate and join architectural pattern; and using a per group technique to split workload and processing into two or more multiple independent chains of computation.

8. The method of claim 7, further comprising extending a stream relational aggregate and join to one or more operators with the per group modifier to express windowed group processing isolation.

9. The method of claim 7, further comprising per group aggregate and join to one or more operators, wherein per group aggregate and join to one or more operators comprises the steps of:

creating a new bucket based on a previously unknown value for a per group attribute;

maintaining at least one individual window and at least one data structure for each aggregation bucket in an aggregate operator;

maintaining at least one individual window and at least one data structure for each equi-join bucket in a join operator; and operating independently on the at least one window and at least one data structure corresponding to each aggregation bucket and join bucket.

10. The method of claim 1, wherein said refining comprises mapping a logical implementation of an application to a physical deployment plan.

11. The method of claim 7, further comprising using the split, aggregate and join architectural pattern to efficiently execute one or more applications where group number is not known a priori.

12. The method of claim 7, wherein splitting workload and processing in a sense-and-respond type stream processing system of at least one application in a split, aggregate and join architectural pattern comprises splitting workload and processing in a sense-and-respond type stream processing system of at least one application in an aggregate and join architectural pattern in a distributed environment.

13. A computer program product comprising a non-transitory computer readable memory having computer readable program code for optimizing data stream processing, said computer program product including:

computer readable program code for employing a split, aggregate and join architectural pattern on an application, wherein the pattern processes the application in one or more different domains;

computer readable program code for employing multiple per-group operators to perform multiple simultaneous group-independent aggregation, split operations and join operation on one or more incoming streams of the application via (i) de-multiplexing the data from the one or more incoming streams into multiple physical streams, the one or more incoming streams containing data belonging to multiple groups multiplexed together with a number of groups is not known a priori and each physical stream corresponding to one of the multiple groups, (ii) aggregating data from the multiple groups to form multiple aggregates and (iii) joining the multiple aggregates with additional data incoming from a same or one and more other groups, and wherein said employing the multiple per-group operators comprises applying a distinct window for performing the simultaneous group-independent split, aggregation and join operations for each of the multiple groups, wherein each said distinct window triggers performance of said operations and termination of the performance of said operations based on the tuples that have been accumulated for the corresponding group;

computer readable program code for generating code, wherein the code facilitates mapping of the application onto a computational infrastructure to enable workload partitioning;

computer readable program code for using the one or more per-group operators to decompose the application into one or more granular components;

computer readable program code for using the code to reassemble the one or more granular components into one or more deployable blocks to map the application to the computational infrastructure, wherein reassembling the one or more granular components to map the application to the computational infrastructure optimizes data stream processing of the application; and computer readable program code for refining the level of granularity associated with the one or more granular components based on said computational infrastructure.

14. The computer program product of claim 13, further comprising computer readable program code for providing language and code generation support.

15. The computer program product of claim 13, further comprising computer readable program code for providing a compiler and run-time support, wherein the compiler outputs code that is tailored to the at least one application and at least one system-specific aspect.

16. The computer program product of claim 13, further comprising computer readable program code for splitting workload and processing in a sense-and-respond type stream processing system of at least one application in a split, aggregate and join architectural pattern, wherein splitting workload and processing in a sense-and-respond type stream processing system comprises:

computer readable program code for obtaining at least one application in a sense-and-respond type stream processing system;

computer readable program code for structuring the at least one application using a split, aggregate and join architectural pattern; and computer readable program code for using a per group technique to split workload and processing into two or more multiple independent chains of computation.

17. The computer program product of claim 16, further comprising computer readable code for per group aggregate and join to one or more operators, wherein per group aggregate and join to one or more operators comprise:

computer readable program code for creating a new bucket based on a previously unknown value for a per group attribute;

computer readable program code for maintaining at least one individual window and at least one data structure for each aggregation bucket in an aggregate operator;

computer readable program code for maintaining at least one individual window and at least one data structure for each equi-join bucket in a join operator; and computer readable program code for operating independently on the at least one window and at least one data structure corresponding to each aggregation bucket and join bucket.

18. The computer program product of claim 16, further comprising computer readable code for using the split, aggregate and join architectural pattern to efficiently execute one or more applications where group number is not known a priori.

19. An apparatus for optimizing data stream processing, comprising:

a memory; and at least one processor coupled to said memory and operative to:

employ a split, aggregate and join architectural pattern on an application, wherein the pattern processes the application in one or more different domains;

employ multiple per-group operators to perform multiple simultaneous group-independent aggregation, split operations and join operation on one or more incoming streams of the application via (i) de-multiplexing the data from the one or more incoming streams into multiple physical streams, the one or more incoming streams containing data belonging to multiple groups multiplexed together with a number of groups is not known a priori and each physical stream corresponding to one of the multiple groups, (ii) aggregating data from the multiple groups to form multiple aggregates and (iii) joining the multiple aggregates with additional data incoming from a same or one and more other groups, and wherein said employing the multiple per-group operators comprises applying a distinct window for performing the simultaneous group-independent split, aggregation and join operations for each of the multiple groups, wherein each said distinct window triggers performance of said operations and termination of the performance of said operations based on the tuples that have been accumulated for the corresponding group;

generate code, wherein the code facilitates mapping of the application onto a computational infrastructure to enable workload partitioning;

use the one or more per-group operators to decompose the application into one or more granular components;

use the code to reassemble the one or more granular components into one or more deployable blocks to map the application to the computational infrastructure, wherein reassembling the one or more granular components to map the application to the computational infrastructure optimizes data stream processing of the application; and refine the level of granularity associated with the one or more granular components based on said computational infrastructure.

20. The apparatus of claim 19, wherein the at least one processor coupled to said memory is further operative to provide language and code generation support.

21. The apparatus of claim 19, wherein the at least one processor coupled to said memory is further operative to provide a compiler and run-time support, wherein the compiler outputs code that is tailored to the at least one application and at least one system-specific aspect.

22. The apparatus of claim 19, wherein in the at least one processor coupled to said memory is further operative to splitting workload and processing in a sense-and-respond type stream processing system of at least one application in a split, aggregate and join architectural pattern, wherein in splitting workload and processing in a sense-and-respond type stream processing system, the at least one processor coupled to said memory is further operative to:

obtain at least one application in a sense-and-respond type stream processing system;

structure the at least one application using a split, aggregate and join architectural pattern; and use a per group technique to split workload and processing into two or more multiple independent chains of computation.

23. The apparatus of claim 22, wherein the at least one processor coupled to said memory is further operative to provide per group aggregate and join to one or more operators, and wherein in providing per group aggregate and join to one or more operators, the at least one processor coupled to said memory is further operative to:

create a new bucket based on a previously unknown value for a per group attribute;

maintain at least one individual window and at least one data structure for each aggregation bucket in an aggregate operator;

maintain at least one individual window and at least one data structure for each equi-join bucket in a join operator; and operate independently on the at least one window and at least one data structure corresponding to each aggregation bucket and join bucket.

24. The apparatus of claim 22, wherein the at least one processor coupled to said memory is further operative to use the split, aggregate and join architectural pattern to efficiently execute one or more applications where group number is not known a priori.

* * * * *